Aug. 27, 1940.   E. R. JAGENBURG   2,212,605
MACHINE FOR CUTTING ANNULAR FRUIT BODIES
Filed Jan. 26, 1940
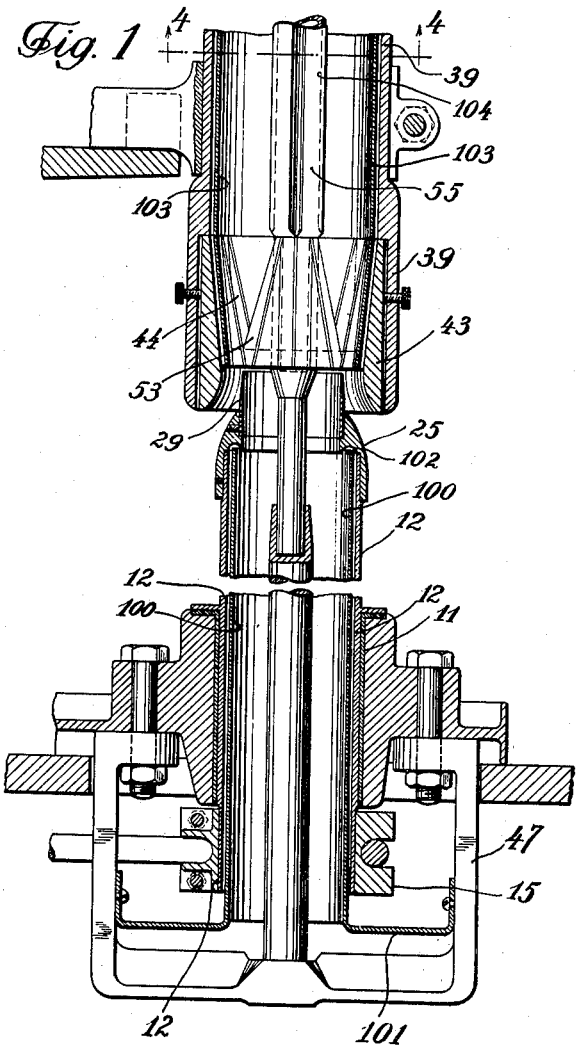
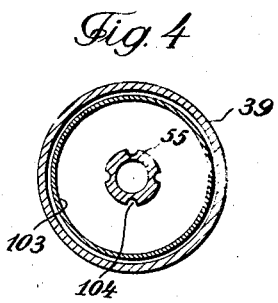
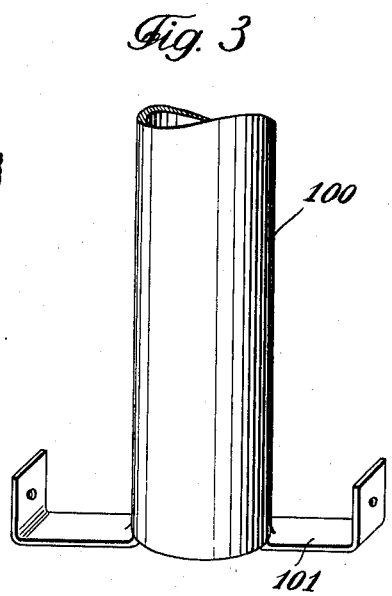
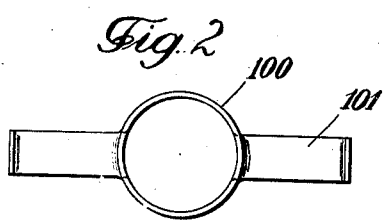
INVENTOR.
E. R. Jagenburg
BY
ATTORNEY.

Patented Aug. 27, 1940

2,212,605

UNITED STATES PATENT OFFICE 2,212,605

MACHINE FOR CUTTING ANNULAR FRUIT BODIES

Eugene Robert Jagenburg, Brooklyn, N. Y.

Application January 26, 1940, Serial No. 315,726

4 Claims. (Cl. 146—6)

The invention relates to an improvement of the fruit cutting machine described in my prior Patent 1,542,554.

According to this patent the fruit is charged in a cylindrical feeding magazine and pressed therefrom into the cutting zone which is provided with a plurality of radial knives having inclined cutting edges and a circular rotating knife for cutting through the fruit slices on a circular line intersecting said radial cuts. The cut fruit portions or a part of same fall through the inner space of the circular rotating knife into a cylindrical rotated transport and guide sleeve and from there into a discharge receptacle situated below said sleeve.

In the operation of the machine the following difficulty has been encountered.

When the cut fruit portions fall from the cutting zone into the inner space of the circular knife carrying rotated sleeve which serves at the same time as a discharge conduit and as a member connecting the circular knife with its driving means, they are tilted out of the position which they originally held in the charged fruit or fruit sections and are set upon edge. These irregularly located fruit portions therefore do not pass smoothly through the tight fitting inner space of the rotated discharge sleeve and in passing down they hinder and block each other; the passage through the sleeve is jammed in a surprisingly short time to such an extent that not alone the operation of the machine is interrupted but the jammed-in fruit particles must be removed from the machine by cutting them out or in any other suitable manner.

This difficulty is increased if thick slices or fruit bodies of considerable height to be cut into fruit sticks are charged into the machine.

A further difficulty has been experienced in the operation of the machine insofar as the air is compressed underneath and between the downwardly pressed fruit slices or bodies which very tightly fit into the feed magazine, this compressed air stopping the free down-passage of the fruit bodies into the cutting zone.

It is therefore the object of this invention to insure a reliable, continuous and uninterrupted operation of the machine independently of the shape and of the dimensions and height of the inserted fruits, fruit sections or slices.

It is a further object of the invention to prevent the change of position of the cut fruit sections in relation to the location which they formerly held in the uncut fruits, fruit sections or fruit slices.

It is a further object of this invention to prevent the cut fruit portions and particularly the fruit sticks from edging and tilting and thereby jamming and blocking the passage through the machine.

It is a further object of the invention to insure a continuous operation of the machine and particularly the uninterrupted production of the fruit sticks independently of the diameter of the charged fruit, fruit sections or fruit slices.

It is a further object to prevent the formation of compressed air back-pressure underneath and within the downwardly pushed fruit bodies.

It is a further object of the invention to produce in a continuous, reliable and uninterrupted operation fruit portions and particularly fruit sticks of varying thickness.

With these and other objects in view the invention is described by way of example and in its relation to Patent 1,542,554 in the following detailed description and illustrated in one of its embodiments in the annexed drawing wherein corresponding parts are denoted by the same numerals as in Patent 1,542,554. In the drawing:

Fig. 1 is a vertical sectional view of the improved feeding magazine, cutting zone and discharging sleeve, Fig. 2 is a perspective view of a cylindrical stationary insert in said sleeve, Fig. 3 is a top view of said insert, Fig. 4 a sectional view on the line 4—4.

The parts of the fruit cutting machine described in my prior Patent 1,542,554 which are improved by the present invention are the feeding magazine or cylinder 39 and the rotating guiding and discharge cylinder or sleeve 12.

As above stated the machine comprises, as far as its identification for the present purpose is deemed necessary, a cylindrical feeding magazine 39 which is supported on the machine base and a central guide spindle 55 for the fruit bodies, which is correspondingly provided with a central bore and is located in the magazine 39. Longitudinal grooves 104 are provided on the circumference of the spindle 55 which effectuate the escape of the air from the pressed-down fruit sections, fruit bodies or slices.

Within the lower part of the feeding cylinder 39 a movable sleeve 43 is located; this sleeve encases the cutting zone which is provided with a series of inclined cutting knives 44 and 53 and a tubular rotating knive 29. Knive 29 is connected through head 25 with the discharge cylinder or sleeve 12 the latter being suitably supported in the machine frame and being rotated within the stationary sleeve 11 by means of the drive pulley 15.

A stationary guiding cylinder 100 is inserted in cylinder 12 in such a manner that the rotation of the latter is not influenced. This stationary cylinder 100 is supported in the hanger bracket 47 by means of arms 101. The cylinder 100 extends with its upper end into a groove 102 provided in the head 25.

A removable tubular member 103 is inserted in the feed magazine 39. A plurality of such tubular members with varying wall thickness or diameter is provided and by the exchange of these members the feeding space can be adapted and accommodated to fruits, fruit sections or fruit slices of varying diameter.

In the operation of the machine the fruits or fruit sections are fed in the magazine 39 and transported in the cutting zone as described in my Patent 1,542,554.

The cut fruit portions fall downwardly through the tubular knive 29 and from there into the inner space of the stationary guide cylinder 100.

By this stationary guide cylinder 100 they are prevented from being contacted and gripped by the rotating sleeve 12. Therefore they are not tilted or set on edge but remain in the position which they were holding in the charged fruits, fruit sections or slices and are downwardly guided in their former relative position through said cylinder 100 to the point of discharge.

The invention is not restricted to the special shape of the guide cylinder shown in the present embodiment of the invention but embraces all stationary means of this type insuring a continuous and uninterrupted downward-slide of the cut fruit particles and particularly fruit sticks.

I claim:

1. In a machine for cutting annular fruit bodies having a central bore into a plurality of portions, a cutting zone, a feed magazine for transporting said fruit bodies into said cutting zone, a central spindle for guiding said fruit bodies, longitudinal bores provided on the circumference of said guide spindle and extending substantially throughout the length of same for effectuating the escape of air, cutting means for producing spaced radial cuts and additional cutting means for producing circular cuts intersecting said radial cuts in said cutting zone and means for discharging the cut fruit portions from said cutting zone.

2. In a machine for cutting annular fruit bodies having a central bore into a plurality of portions, a cutting zone, a cylindrical feed magazine on top of said cutting zone for transporting said fruit bodies into said cutting zone, a detachable cylindrical lining of varying wall-thickness in said magazine, a central guide shaft in said feed magazine, longitudinal bores on the circumference of said shaft, cutting knives for producing spaced cuts in the fruit bodies extending radially from the inner and outer edges thereof and at least one additional rotating knive for cutting through the fruit bodies on a circular line intersecting said radial cuts, a rotating sleeve for dischaging said fruit portions from the cutting zone, a head connecting said rotating knife and said rotating discharging sleeve, a circular groove in said head and a stationary guiding cylinder in said discharging sleeve extending with its upper edge in said groove and being connected with its bottom end to a part of the machine frame.

3. In a machine for cutting annular and particularly sliced annular fruit bodies into a plurality of portions, a cutting zone, means for transporting said fruit bodies into said cutting zone, cutters for producing spaced radial cuts and at least one rotating cutter for producing circular cuts intersecting said radial cuts in said cutting zone, means for rotating said rotary cutter, a rotatable sleeve connecting said cutter and said driving means, means for preventing the rotation of the fruit bodies within the circular cutter, said means including a transporting stationary tube within said rotatable sleeve extending up to the lower edge of said rotary cutter and preventing a change of the original relative location of the cut fruit portions.

4. In a machine for cutting annular and particularly sliced annular fruit bodies into a plurality of portions, a cutting zone, means for transporting said fruit bodies into said cutting zone, cutters for producing spaced radial cuts and at least one rotary cutter for producing circular cuts intersecting said radial cuts in said cutting zone, means for rotating said rotary cutter, a rotatable sleeve connecting said cutter and said driving means, a head connecting said rotatable sleeve and said rotary cutter, a circular groove in said head and means for preventing the rotation of the fruit bodies within the circular cutter, said means including a stationary fruit transporting tube within said rotatable sleeve, said stationary tube extending up to the lower edge of the rotary cutter and preventing a change of the original relative location of the cut fruit portions.

EUGENE ROBERT JAGENBURG.